US009769043B2

United States Patent
Modai et al.

(10) Patent No.: US 9,769,043 B2
(45) Date of Patent: Sep. 19, 2017

(54) ADAPTIVE MANAGEMENT OF A MEDIA BUFFER

(71) Applicant: Avaya Inc., Basking Ridge, NJ (US)

(72) Inventors: Ori Modai, Ramat Hasharon (IL); Gal Eliraz-Levonai, Tel-Aviv (IL)

(73) Assignee: Avaya Inc., Basking Ridge, NJ (US)

( * ) Notice: Subject to any disclaimer, the term of this patent is extended or adjusted under 35 U.S.C. 154(b) by 477 days.

(21) Appl. No.: 14/492,721

(22) Filed: Sep. 22, 2014

(65) Prior Publication Data

US 2016/0087866 A1   Mar. 24, 2016

(51) Int. Cl.
*G06F 15/16* (2006.01)
*H04L 12/26* (2006.01)
*H04L 12/835* (2013.01)
*H04L 29/06* (2006.01)

(52) U.S. Cl.
CPC ...... *H04L 43/0841* (2013.01); *H04L 43/0864* (2013.01); *H04L 47/30* (2013.01); *H04L 65/604* (2013.01); *H04L 43/16* (2013.01)

(58) Field of Classification Search
CPC . H04L 43/0841; H04L 43/0864; H04L 43/16; H04L 65/604
See application file for complete search history.

(56) References Cited

U.S. PATENT DOCUMENTS

| 9,380,091 | B2* | 6/2016 | Bao | H04L 65/605 |
| 9,462,021 | B2* | 10/2016 | Ramamurthy | H04L 65/60 |
| 2003/0067877 | A1* | 4/2003 | Sivakumar | H04L 47/2416 370/232 |
| 2006/0187970 | A1* | 8/2006 | Lee | H04L 47/2416 370/516 |
| 2007/0171928 | A1* | 7/2007 | Kim | H04L 47/10 370/412 |
| 2007/0201365 | A1* | 8/2007 | Skoog | H04L 47/10 370/230.1 |
| 2009/0122878 | A1* | 5/2009 | Liu | H04L 29/06027 375/240.26 |

(Continued)

OTHER PUBLICATIONS

H. Nam, K. H. Kim, B. H. Kim, D. Calin, and H. Schulzrinne, "Towards dynamic QoS-aware over-the-top video streaming," in IEEE WoWMoM 2014, Jun. 2014, pp. 1-9.*

(Continued)

*Primary Examiner* — John MacIlwinen

(57) ABSTRACT

Embodiments disclosed herein provide systems, methods, and computer readable media that perform adaptive management of a media buffer. In a particular embodiment, a method provides receiving packets representing a media stream into the adaptive media buffer, wherein the media stream comprises a sequence of media segments structured into segment layers, and detecting loss of one or more of the packets representing one of the media segments. The method further provides estimating a round trip delay for packets between the adaptive media buffer and a sender of the media stream and determining a current depth of the media segments within the adaptive media buffer. In response to detecting the packet loss, the method provides discarding media segments within the adaptive media buffer based on the round trip delay, the current depth, and a layer of the segment layers into which each of the one or more media segments is included.

20 Claims, 5 Drawing Sheets

(56) References Cited

U.S. PATENT DOCUMENTS

2013/0227122 A1* 8/2013 Gao .................. H04L 65/1083
709/224
2014/0181179 A1* 6/2014 Clark .................. H04L 65/608
709/203

OTHER PUBLICATIONS

M. Schier and M. Welzl, "Optimizing selective ARQ for H.264 live streaming: A novel method for predicting loss-impact in real time," IEEE Trans. Multimedia, vol. 14, No. 2. Apr. 2012. pp. 415-430.*
X. Ge and G. Wang, "Distortion Based Selective Packet Discard in H.264/SVC Video Transmission". 2013 3rd International Conference on Computer Science and Network Technology. IEEE. Oct. 2013, pp. 1111-1114.*

* cited by examiner

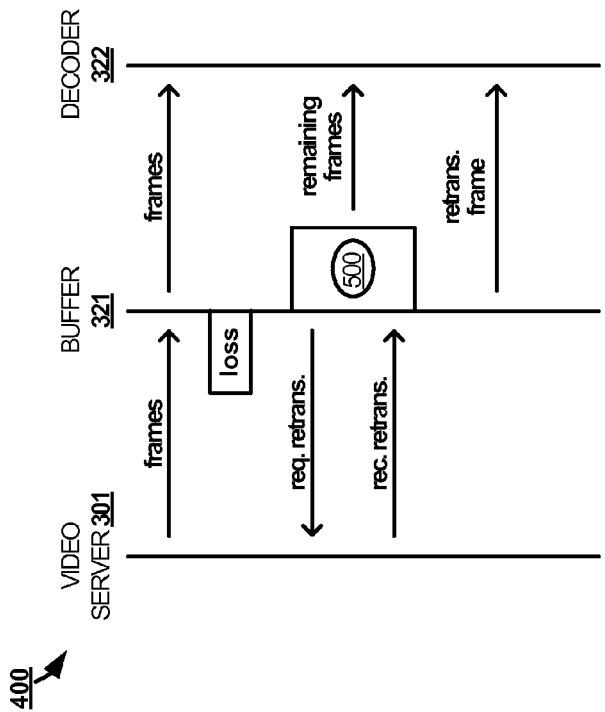
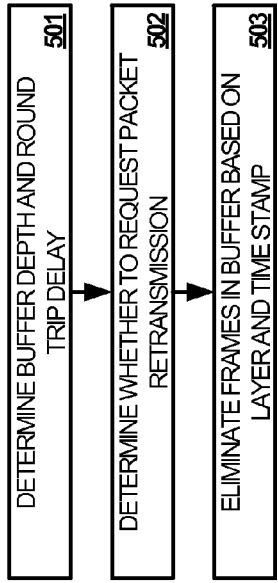
Figure 4
Figure 5

ADAPTIVE MANAGEMENT OF A MEDIA BUFFER

TECHNICAL BACKGROUND

Streaming media, video, audio, animation, or otherwise, has become very popular as network connection bandwidth and quality has increased. When a particular selection of media is stored on a server, that selection can be streamed to one or more requesting devices on demand. Moreover, to account for network issues that may inhibit the media stream, the server can transfer the media stream faster than it can be presented at the receiving device. This faster transfer allows the receiving device to store the media locally for presentation in a process commonly called buffering. If a media server or network issue occurs that cuts off or slows the media stream, the buffered media is unaffected, which allows for unhampered presentation of the media and provides extra time for the server or network to recover.

While the above buffering process works for media that exists on a server and can be sent ahead of time to a device, in the case of live or real-time media streams, that luxury does not exist. In particular, during live content streaming, the delay caused by storing media in a buffer may be detrimental to the live presentation experience. Likewise, with real-time communications, excess delay in presenting other parties on a communication harms the flow of the communication session. Accordingly, issues that arise when transferring live and real-time communication streams are not able to be mitigated using a traditional buffering scheme.

Overview

Embodiments disclosed herein provide systems, methods, and computer readable media that perform adaptive management of a media buffer. In a particular embodiment, a method provides receiving a plurality of packets representing a media stream into the adaptive media buffer, wherein the media stream comprises a sequence of media segments structured into a plurality of segment layers, and detecting loss of one or more packets of the plurality of packets, wherein the one or more packets represent a media segment of the plurality of media segments. The method further provides estimating a round trip delay for packets between the adaptive media buffer and a sender of the media stream and determining a current depth of the media segments within the adaptive media buffer. In response to detecting the loss of the one or more packets, the method provides discarding one or more media segments of the media segments within the adaptive media buffer based on the round trip delay, the current depth, and a layer of the plurality of segment layers into which each of the one or more media segments is included.

In some embodiments, the method further provides, in response to detecting the loss of the one or more packets, determining whether to request retransmission of the one or more packets based on the round trip delay and the current depth.

In some embodiments, upon determining to request retransmission, the method provides requesting the one or more packets from the sender and holding frames starting with the media segment until the one or more packets are received from the sender, and, upon determining not to request retransmission, the method provides discarding the media segment and other media segments that refer to the media segment from the adaptive media buffer.

In some embodiments, upon receiving the one or more packets from the sender, the method provides passing the media segment to a decoder and passing remaining media segments to a decoder at a rate that speeds up presentation of the media stream until buffer delay returns to a threshold delay value.

In some embodiments, the plurality of segment layers include a base layer and a plurality of enhanced layers that each refer either to a media segment of the base layer or to a media segment of a lower enhanced layer of the plurality of enhanced layers.

In some embodiments, a media segment included in a higher level enhanced layer is more likely to be discarded than a media segment in either a lower level enhanced layer or a base layer.

In some embodiments, discarding the one or more media segments is further based on content priority indicators associated with the media segments.

In some embodiments, estimating the round trip delay comprises measuring a depth of the media segments within the buffer during one or more packet retransmission events and determining the round trip delay based on the depths of the media segments within the buffer during the one or more packet retransmission events.

Another embodiment provides a non-transitory computer readable medium having instructions stored thereon. When executed by a processor system, the instructions direct the processor system to perform a method of managing an adaptive media buffer. The method includes receiving a plurality of packets representing a media stream into the adaptive media buffer, wherein the media stream comprises a sequence of media segments structured into a plurality of segment layers, and detecting loss of one or more packets of the plurality of packets, wherein the one or more packets represent a media segment of the plurality of media segments. The method further includes estimating a round trip delay for packets between the adaptive media buffer and a sender of the media stream and determining a current depth of the media segments within the adaptive media buffer. In response to detecting the loss of the one or more packets, the method provides discarding one or more media segments of the media segments within the adaptive media buffer based on the round trip delay, the current depth, and a layer of the plurality of segment layers into which each of the one or more media segments is included.

Yet another embodiment provides an adaptive media buffer management system comprising a communication interface, a processing system, and a memory system. The communication interface is configured to receive a plurality of packets representing a media stream into the adaptive media buffer, wherein the media stream comprises a sequence of media segments structured into a plurality of segment layers. The processing system is configured to detect loss of one or more packets of the plurality of packets, wherein the one or more packets represent a media segment of the plurality of media segments, estimate a round trip delay for packets between the adaptive media buffer and a sender of the media stream, determine a current depth of the media segments within the adaptive media buffer, and, in response to detecting the loss of the one or more packets, discarding one or more media segments of the media segments within the adaptive media buffer based on the round trip delay, the current depth, and a layer of the plurality of segment layers into which each of the one or more media segments is included. The memory system is configured to store the adaptive media buffer.

BRIEF DESCRIPTION OF THE DRAWINGS

Many aspects of the disclosure can be better understood with reference to the following drawings. While several

FIG. 4 illustrates a sequence diagram of an implementation.

FIG. 5 illustrates a method in an implementation.

DETAILED DESCRIPTION

Figure 1:
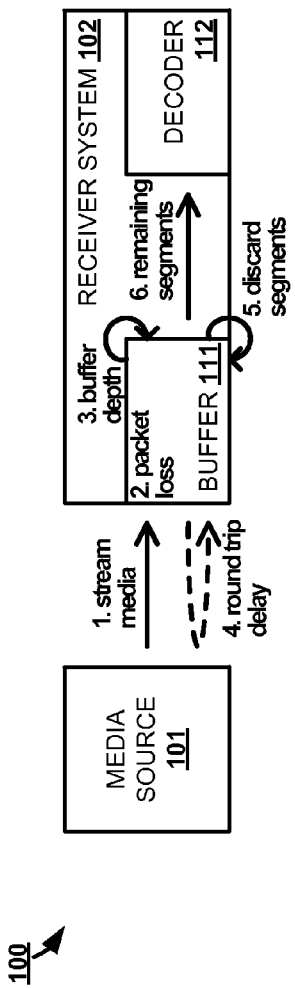
FIG. 1 illustrates an adaptive media buffer operational scenario in an implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide for adaptively managing a media buffer to improve presentation of real-time (or near real-time) media content. Such real-time media does not have the luxury of storing at least a few seconds worth of the media in a memory buffer local to the presenting system or device. Therefore, any issues that may arise in the network, the serving media system, or otherwise, to cause data packet loss when streaming the media cannot be mitigated by such a large buffer. Specifically, any buffer that is used to buffer real-time media must be small enough so that the media is still considered to be real-time when passed from the buffer and presented at a receiving device or system. Any undue delay, especially in the case of media carrying real-time communications (e.g. video conferencing), frustrates the experience of a user to which the media is being presented. Accordingly, a typical buffer being used for real-time media presentation is more susceptible to issues causing packet loss for a media stream.

To mitigate packet loss in a real-time media stream, the adaptive media buffer described herein weighs network conditions and the media content within the buffer itself when determining how to handle packet loss. Based on the weighing of conditions and contents, the adaptive buffer will determine whether to request retransmission of lost packets, discard the media represented by the lost packets, or discard portions of the media currently in the buffer in order to improve the media presentation experience. While discarding portions of the media will likely degrade the presentation of the media stream, the portions of the media that are selected to be discarded typically still allow presentation of the media stream to continue without more bothersome side effects, such as freezing video while packets are retransmitted or artifacts caused by attempts to estimate information in the missing packets. Discarding portions of the media further allows the buffer delay to be reduced because the media is presented more quickly due to segments being presented at the same rate even though there are fewer segments to present. Likewise, aside from any retransmitted packets, the adaptive media buffer described herein does not require additional bandwidth, as would a media stream that includes forward error correction (FEC) information.

FIG. 1 illustrates a representative operational scenario 100 for managing an adaptive media buffer. Operational scenario 100 includes media source 101 and receiver system 102. Media source 101 may be a media server, a user system or device, a communication server, or any other type of system capable of streaming media content. Receiver system 102 includes adaptive media buffer 111 and media decoder 112. Receiver system 102 may be a personal computer, smartphone, tablet, set-top box, or any other computing device that is capable of receiving and presenting a media stream. Adaptive media buffer 111 and media decoder 112 may each be implemented using software, firmware, or other type of computer executable instructions executing on processing circuitry of receiver system 102. Alternatively, either or both of media buffer 111 and media decoder 112 may be implemented using dedicated hardware circuitry. Likewise, adaptive media buffer 111 may share the system memory of receiver system 102 for buffering media or may instead use dedicated memory.

In operational scenario 100, a media stream is transferred from media source 101 at step 1. Data packets are used to transfer the media stream. The media stream may simply be segmented into data packets, a media stream segment may be represented by more than one data packet, or a data packet may represent more than one media segment. In a particular example, the media stream is a video stream and the segments comprise frames of the video, which are received in data carried by one or more of the packets. However, audio or other types of media may be segmented in other ways. The media stream may be transferred in response to a request for the media stream, may be initiated as part of a real-time communication, or for any other reason that a media stream may be transferred from a source. The media stream may be a video, audio, animation, presentation, or any other type of media that can be streamed—including combinations thereof. Upon receipt, the packets are stored within adaptive media buffer 111. As alluded to above, the management of adaptive media buffer 111 described herein may be performed by processing circuitry within buffer 111 itself or may be implemented in other processing resources of receiver system 302.

The amount of media segments stored within the buffer should be small enough so as the time spent in buffer 111 before being passed to decoder 112 does not affect the real-time aspect of the media stream. Thus, considering there is likely delay already added at least from the packets traversing a network between media source 101 and receiver system 102, the media segments stored in adaptive media buffer should preferably represent a small amount of time that is dependent upon the type of media. For example, the media segments for one type of media stream may represent under a second's worth of the media stream while communication media segments in particular would preferably represent under 250 milliseconds of the media stream. In this embodiment, the media segments are passed to decoder 112, which decodes the segments to present the media stream on receiver system 102. In other embodiments, the media segments may be passed to modules other than decoder 112 from buffer 111.

Additionally, the media segments are structured into layers. When structured into layers, at least some of the media segments refer to other media segments so that only the differences between segments need be transferred. For example, segments in higher layers refer to segments in lower layers, which allows for each higher layer segment to include data representing a difference between it and the segment to which it refers rather than the entirety of the data needed to represent the segment. Thus, this layered configuration reduces the data footprint of the media stream.

During the media stream at step 2, one or more of the packets in the media stream were lost in transmission from media source 101. A packet may be considered lost if it was never received, was received with errors, was received incomplete, or some other reason that renders the packet unusable.

A current depth of the media segments within adaptive media buffer 111 is determined step 3 and a round trip delay for packets between buffer 111 and media source 101 is estimated at step 4. While one or both of steps 3 and 4 may be performed in response to detecting the packet loss, one or both of steps 3 and 4 may be performed throughout the duration of the media stream in anticipation of the packet loss being detected. The current depth of the media segments indicates a number of media segments that can be passed to decoder 112 before reaching the media segments represented, at least in part, by the lost packets. Based on the number of media segments presented per second in the media stream, this depth of media segments can be converted to an amount of time until the media segments presented represented by the lost packets are reached.

In some examples, the round trip delay may be measured by sending a test message to and measuring the amount of time that elapses before receiving a response from source 101. In other examples, the round trip delay may be estimated by tracking the depth of the media segments within buffer 111 over time. In particular, once packet loss is detected, if the retransmission of the packet(s) is requested, media segments within buffer 111 are held while waiting for the retransmission, which will result in a short freeze in the media. During the hold, media segments continue to be received and placed into buffer 111. Based on the time duration of the media represented by the media segments received after the hold and before the retransmitted packets are received, the round trip delay is estimated (e.g. the time duration may be equated to the estimated round trip delay).

Media segments for the media stream are selectively discarded at step 5 based on the round trip delay, the depth of the buffer, and the layer in which each of the media segments is included. That is, at least these three factors are balanced to determine the segments that should be discarded to ensure presentation of the media can continue without interruption. These discarded media segments may be from the media segments currently in the buffer but also media segments received and placed into adaptive media buffer 111 after the detection of the packet loss. Likewise, the media segment(s) represented by the lost packets may be included in the discarded media segments.

For example, if the round trip delay is less than the depth of the buffer, then no segments may be discarded because the lost packets will be requested and received before the preceding media segments in the buffer are depleted. However, if the round trip delay is greater than the current depth of the buffer, then media segments will be discarded according to their layer before the remaining segments are passed to decoder 112 at step 6. More specifically, segments in higher layers, which are referred to by fewer segments, are more likely to be discarded from buffer 111 because the loss of any particular segment effectively also causes the loss of any segment referring thereto. Hence, the quality of the media stream presentation will be less affected by discarding higher layer segments than by discarding lower layer segments.

In cases where the packets are not retransmitted or the retransmitted packets are received before the lost media segment should be passed to decoder 112, the above selective discard of media segments means that the presentation of the stream will not freeze while still being comprehendible. For example, the media segments may represent video frames and the discarded segments correspond to discarded video frames. Thus, discarding video frames may lower the frame rate of a video stream but allows the presentation of the video stream to continue at a lower delay. In a similar example, the media segments may be segments of an audio stream and, while the discarded segments may lower the fidelity of the audio stream, the audio stream is still comprehendible as long as the discarded packets apply to low energy (e.g. lower voice activity packets).

In other cases, as alluded to above, if it is determined that lost packets should be retransmitted and the retransmitted packets are not received by the time their media segment should be passed to decoder 112, then media segments beginning with the media segment represented by the lost packets are held in buffer 111 until the retransmitted packets are received. This causes media segments to build up in buffer 111 during retransmission, which increases the buffer delay and may adversely affect the media presentation experience. Thus, in these situations, media segments are discarded to speed up presentation of the media stream until buffer delay is reduced back to an acceptable level, which may be indicated by a predetermined threshold buffer depth.

In some embodiments, the determination of whether to discard a particular media segment is further based upon an indicator of segment content importance within the segment or the packets carrying data for that segment. For example, in the case of audio media, a segment of audio data (typically equivalent to a packet carrying audio data) may include information about an audio power level represented by the segment. Lower power levels may be discarded before higher power levels (which may be differentiated based on one or more thresholds) since it is less likely that a lower audio power level represents audio information that should be heard. Similarly, voice activity detection (VAD) may be used to indicate whether a segment includes relevant audio information. That is, if a segment indicates that there is no voice activity within the audio of the segment, then that segment can be discarded with little to no effect on the presentation of the audio.

In further embodiments, based on the depth of the buffer and the round trip delay, the adaptive media buffer may change from requesting retransmission of lost segments to requesting that segments be sent using forward error correction from source 101. Additionally, the adaptive media buffer may be able to reset in order reduce the buffer segment delay and begin buffering the stream anew.

It should be understood that the above processes are continually repeated as more lost packets are detected by receiver system 102. Thus, the round trip delay and buffer depth are continually determined in response to detecting lost packets. Accordingly, receiver system 102 may further consider the totality of the segments represented by the lost packets when determining whether to discard segments. For example, if enough packets are being lost (e.g. above a predetermined threshold), all segments of a certain level and above may be discarded until the rate of packet loss decreases (e.g. falls below a threshold).

Advantageously, operational scenario 100 selectively discards media packets based on both network conditions (e.g. the round trip delay) and the media itself (e.g. the amount of segments in the buffer and to which layers those segments belong). Thus, while discarding media segments may cause a degradation in the quality of the media's presentation (e.g. a reduction in a video frame rate), discarding media segments reduces freezing the presentation and does not require the added bandwidth needed by forward error correction.

Figure 2:
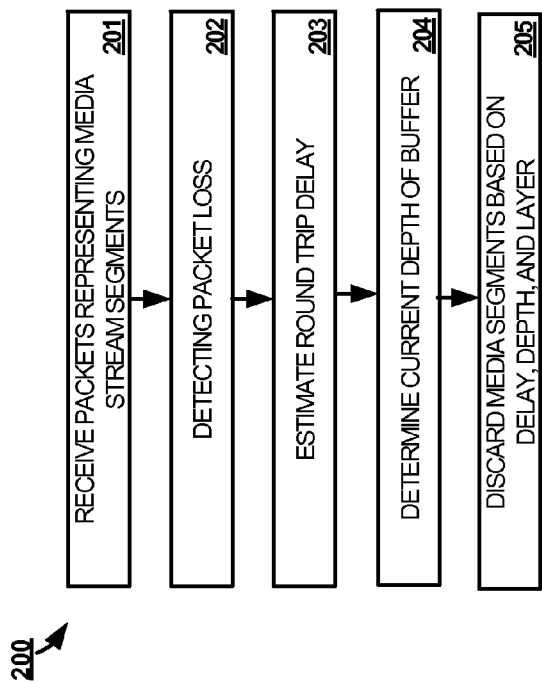
FIG. 2 illustrates a method of managing an adaptive media buffer in an implementation.

FIG. 2 illustrates method 200 for managing adaptive media buffer 111. Method 200 includes receiving a plurality of packets representing a media stream into the adaptive media buffer (step 201). The media stream comprises a sequence of media segments structured into a plurality of segment layers. The media stream may be any type of media, including but not limited to video and audio, and the media segments may be any possible way in which the media can be divided for streaming.

During the media stream, the method provides detecting loss of one or more packets of the plurality of packets (step 202). The one or more packets represent a media segment of the plurality of media segments. Hence, the media segment has not been fully received due to the loss of the one or more packets.

The method further provides estimating a round trip delay for packets between adaptive media buffer 111 and a sender of the media stream, source 101 (step 203). Additionally, the method provides determining a current depth of the media segments within the adaptive media buffer (step 204). Steps 203 and 204 may be performed in response to detecting the packet loss or may be performed repetitively throughout the media stream so as the round trip delay and current depth of buffer 111 are already known in the event of packet loss detection.

In response to detecting the loss of the one or more packets, the method provides discarding one or more media segments of the media segments within the adaptive media buffer based on the round trip delay, the current depth, and a layer of the plurality of segment layers into which each of the one or more media segments is included (step 205). The method therefore weighs the amount of time in which it would take to receive retransmitted packets, the amount time represented by the media segments within buffer 111 before the lost packets will be needed, and the layers into which the media segments are included to determine which media segments should be discarded from the media stream with minimal disruption to the media stream's presentation.

Figure 3:
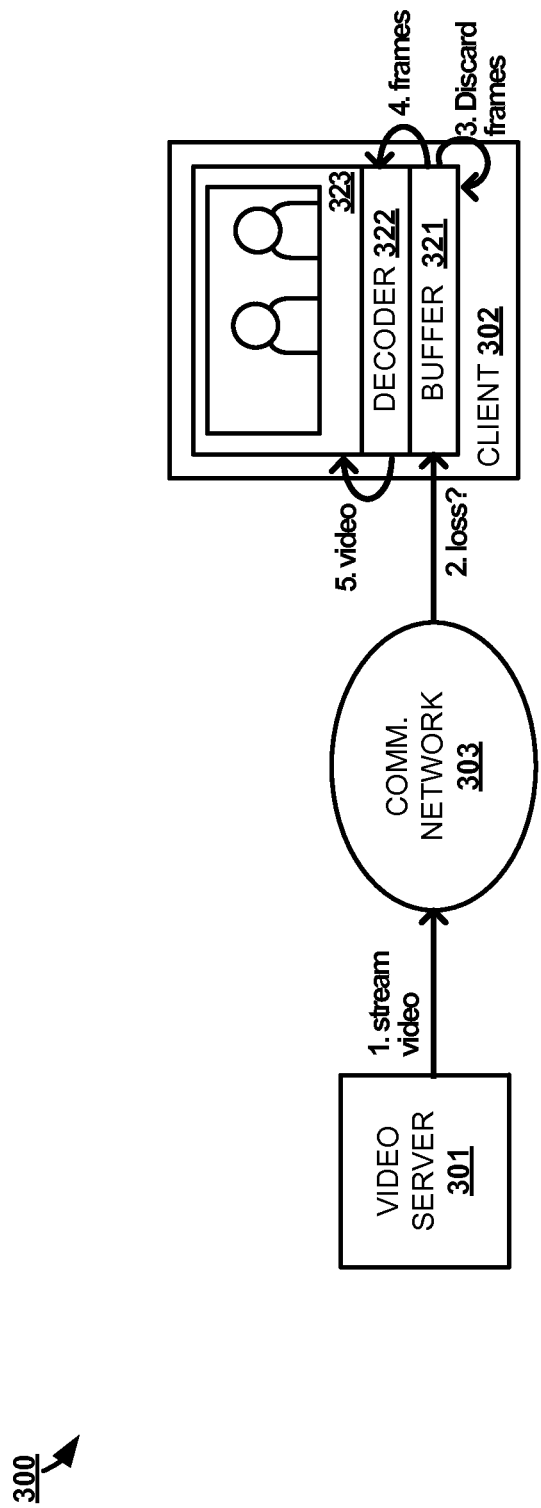
FIG. 3 illustrates a networked operational scenario in an implementation.

FIG. 3 illustrates a multi-client operational scenario 300 in which an adaptive media buffer buffers a real-time video stream. Operational scenario 300 includes video server 301, client device 302, and communication network 303. Video server 301 may be a video conferencing server, a live video streaming server, a peer client device, or any other system capable of streaming video. Client device 302 includes adaptive media buffer 321, video decoder 322, and display 321. Client device 302 may be a computer, tablet, smartphone, gaming system, or other device capable of receiving and displaying streamed video. Communication network 303 comprises network elements, such as switches, wireless access nodes, Internet routers, network gateways, application servers, computer systems, communication links, or some other type of communication equipment—including combinations thereof.

In operational scenario 300, real-time video is streamed from video server 301 to client device 301 at step 1. The video is transferred as sequence of video frames with each frame transported within at least one packet. Moreover, each frame is encoded using a video codec that uses frames that refer to at least one previous frame in order to optimize the amount of data needed to represent the video. Based on this property, the video is separated into layers wherein frames in a lower layer are referred to by frames in a higher layer. The frames at the highest layer are not referred to by any other frames. As the frames are received, the frames are placed in adaptive media buffer 321. Since the frames may be received out of sequence due to various conditions that may exist on paths through communication network 303, the frames are place into their correct sequence in buffer 321 before being passed to decoder 322.

At step 2, while the video is being streamed, a loss of one or more of the packets carrying the data representing a frame is detected by client device 302. A packet may be considered lost if it was never received, was received with errors, was received incomplete, or some other reason that renders the packet unusable. Accordingly, since the packet is lost, the frame that the data represents is also lost, which could adversely affect the presentation of the video by client device 302.

However, to ensure that the video is presented with minimal issues, client device 302 determines whether frames should be discarded and whether the lost packets should be retransmitted at step 3. These frames may be frames already within buffer 321 or frames received after the lost packets are detected. This determination is based on the number of frames within the buffer, the round trip delay that will occur if lost packet retransmission is requested, and the layer in which each discarded frame is placed. For example, frames that refer to the frame represented by the lost packets are discarded if the lost packets will not be received, based on the round trip delay, until after those frames are supposed to be presented. In another example, if the frame represented by the lost packets has few enough other frames that refer to it (e.g. below a threshold number), then that frame may simply be discarded along with all the referring frames.

It should be understood that the term discarded as used herein means that the frame is not presented. In some instances, subsequent frames that are presented reference a non-presented frame. Thus, the non-presented frame is maintained for such reference at least until it is no longer needed for reference.

Any frames that are not discarded are passed to decoder 322 at step 4. Decoder 322 uses the video codec used to encode the video stream to decode the video stream from the frames received from buffer 321. Once the frames are decoded, step 5 displays the frames on display 323. While the discarded video frame(s) lower the frame rate of the presented video, the video is displayed without freezing and without the need for error concealment or recovery. Therefore, the presentation of the video stream is able to continue uninterrupted, albeit with lower quality.

It should be understood that packet loss may occur numerous times throughout the video stream. Therefore, steps 2 and 3 may be performed numerous times to ensure that the video stream is presented without interruption caused by the lost packets.

FIG. 4 illustrates a sequence diagram of operational scenario 400 in which adaptive media buffer 321 buffers a real-time video stream. In scenario 400, a real-time video stream is initiated and streamed using packets from video server 301 to adaptive media buffer 321 over communication network 303. Frames of the video stream are encoded into layers where higher layer frames refer to lower layer frames. Additionally, each frame includes a time stamp indicating the order in which the frames fall within the video stream. Adaptive media buffer 321 buffers frames of the video before passing them to decoder 322 so that client 302 can present the frames. During the video stream, client 302 detects at least one of the packets carrying the data for a frame of the video stream. Upon detecting the loss, client 302 uses operation 500 to determine which, if any, frames should be discarded to continue the presentation of the video stream.

FIG. 5 illustrates operation 500 for determining which frames should be discarded in an exemplary embodiment. Client 302 determines the depth of the buffer and estimates the current round trip delay of data packets over network 303 (step 501). Using the buffer depth and round trip delay, client 302 can determine whether to request retransmission of the lost packets (step 502). Specifically, the buffer depth indicates the amount of time until the frame represented by lost packets is to be passed to decoder 322. Therefore, if that time is greater than the round trip delay, then the packets can be retransmitted and received by client 302 before the frame needs to be passed to decoder 322. Likewise, if enough subsequent frames refer to the frame represented by the lost packets, client 302 will request retransmission of those packets even if the buffer depth indicates that the frame represented by those packets should be displayed before receipt of the retransmission. If step 502 determines that the packets should be retransmitted, then client device 302 requests retransmission of the packets, as shown in operational scenario 400.

Continuing with operation 500, regardless of whether packet retransmission is requested, client device 302 determines whether to discard certain frames of the video stream based on the layer in which the discarded frames are included and a time stamp of the frames (step 503). Generally, higher-level frames are discarded before lower level frames and older frames, as indicated by the time stamp, are discarded before newer frames. Frames may be discarded to prevent freezing of the video or may be discarded to reduce buffer delay caused by frame build up in buffer 321 during the freeze.

In particular, if step 502 determines that lost packets should be retransmitted to recover a lost frame represented by the lost packets, then frames subsequent to the lost frame are held in buffer 321 while the packets are retransmitted. This will cause a short freeze in the playback of the video and create a larger delay within buffer 321. Once the lost packets are received after requesting retransmission, the lost frame can be passed to decoder 322. Additionally, in order to reduce the delay that was built up while the packets were held, frames are discarded at step 503 to effectively speed up video presentation until buffer delay is back to an acceptable level (e.g. <250 milliseconds) by sending frames to decoder 322 at the normal rate even though some frames have been discarded.

Alternatively, if step 502 determines that the lost packets should not be retransmitted, then step 503 determines to discard the frame(s) represented by those packets and any frames that refer to the lost frame. The remaining frames are passed to decoder 522. This allows presentation of the video to continue without freezing, albeit at a reduced frame rate.

In some embodiments, operational scenario 400 and operation 500 may be selectively used to manage buffer 321. Specifically, if an ongoing pattern of packet loss indicates that packet loss is burst in nature (i.e. less frequent), then the retransmission scenarios described above is acceptable, as the freezes due to retransmission is less frequent. However, if packet loss is more consistent, then the side effects of retransmission are less desirable as the buffer delay will likely also be consistent.

Figure 6:
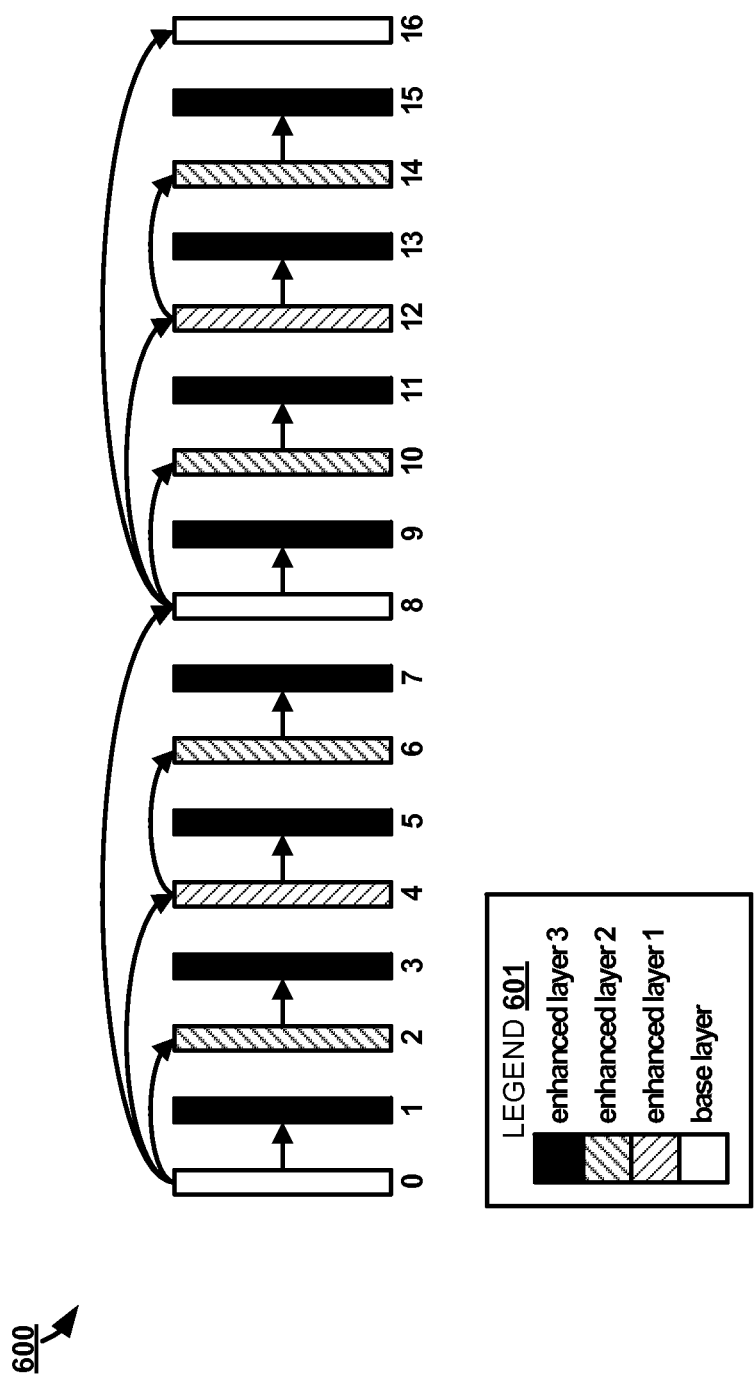
FIG. 6 illustrates a typical layered frame sequence in an operational scenario.

FIG. 6 illustrates an exemplary layered frame sequence 600. The frames of frame sequence 600 are divided into four different layers, a base layer and three successive enhanced layers, which can be differentiated using legend 601. It should be understood that video frames may be encoded to include more or fewer enhanced layers. Furthermore, some video encodings may include base layer frames that do not refer to any other frames.

The arrows of frame sequence 600 point from a lower layer frame to any frame that refers to that lower layer frame. Accordingly, base layer frames are the lowest layer frames, which are referred to by the most other frames either directly or indirectly. For example, four frames (frames 1, 2, 4, and 8) refer directly to base layer frame 0 and four frames (frames 3, 5, 6, and 7) refer indirectly to base layer frame 0 for a total of 8 frames. Enhanced layer 1 is one level higher than the base layer and each frame at this layer is referred to directly by two frames and indirectly by one frame. Enhanced layer 2 is one level higher than enhanced layer 1 and each frame at this layer is referred to by only one frame. Finally, frames in enhanced layer 3 are not referred to by any other frames.

During a video stream frames 0-16 are to be presented in ascending numerical order. Accordingly, if frames 0-16 are being held in an adaptive media buffer, the frames will be passed to a decoder starting with frame 0 and continuing through frame 16. Of course, though not shown, additional frames beyond frame 16 may be received as part of the video stream.

In operation, when receiving frames 0-16 and placing them into an adaptive media buffer before being passed to a decoder, a receiving device may determine that one or more packets representing a frame are lost. After detecting the loss, the receiving device determines a current depth of an adaptive media buffer and estimates a round trip delay to request retransmission of the lost packets. This information is then used to determine whether to request retransmission of the packets and whether to discard any of the frames.

In one example, the lost packets represent frame 7 from frame set 600. Frame 7 is in enhanced layer 3 and therefore has no frames referring to it. If the adaptive media buffer currently includes frames 0-6 and the round trip delay allows for the lost packets to be received before frame 7 is due to be passed to the decoder, then the device requests retransmission of frame 7's lost packets. Alternatively, if frame 7 is due to be passed to the decoder before retransmitted packets can be received, then frame 7 is discarded from the adaptive media buffer. The video will therefore be presented by the receiving device without frame 7. While discarding frame 7 may cause a viewer to perceive a small jump in the video, the video does not freeze.

In another example, the lost packets represent frame 12 from frame set 600. Frame 12 is in enhanced layer 1 and therefore is referred to directly by frame 13 in enhanced layer 3 and frame 14 in enhanced layer 2. Additionally, frame 15 in enhanced layer 3 refers to frame 14 and, thus, also indirectly refers to frame 12. As was done with the lost packets of frame 7, the receiving device determines the current depth of the adaptive media buffer and the round trip delay for requesting packet retransmission for use when determining whether to discard packets. Since frame 12 is of a lower level than frame 7, discarding frame 12 causes frames 13-15 to be discarded as well since each of those frames refers to frame 12. While a four frame gap in the presentation of the video stream may cause a more noticeable jump, the video does not freeze.

Additionally, in some cases, frames may be held within the adaptive media buffer while frame 12 is retransmitted. This effectively increases the delay caused by additional packets accumulating within the adaptive media buffer. However, once frame 12 is received after being retransmitted, frames referring to frame 12 do not need to be discarded. Accordingly, the determination to hold frames within the adaptive media buffer is more likely to occur due to retransmission of lower layer frames since more frames refer to lower layer frames than to higher layer frames.

In the two examples from above, the frames are discarded on a single instance basis. However, operational scenarios described herein also apply to situations where packets continue to be lost during a video stream. The more packets that continue to be lost, the more frames may be discarded. For example, if the delay built up in the adaptive media buffer (e.g. caused by more packet retransmissions) becomes greater than a threshold, all frames of enhanced layer 3 may be discarded until the buffer delay improves to at least within a threshold amount of buffer delay. This effectively speeds up the presentation of the video to two times its normal rate since half of the frames are not used.

If conditions worsen and even more delay built up in the adaptive media buffer (e.g. above a second, higher threshold for delay), then even lower layer packets may be discarded from the adaptive media buffer. For example, enhanced layer 2 frames may be discarded in addition to enhanced layer 3 frames, which effectively doubles the frame rate again.

Figure 7:
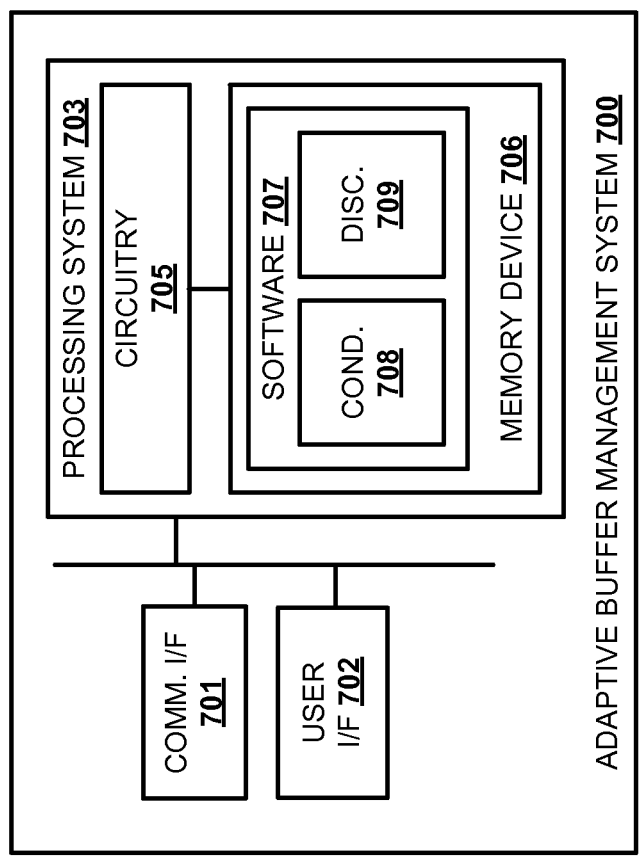
FIG. 7 illustrates a computing architecture for implementing an adaptive media buffer management system.

FIG. 7 illustrates adaptive buffer management system 700. Adaptive buffer management system 700 is an example of receiver system 102 and client device 302, although system 102 and device 302 could use alternative configurations. Adaptive buffer management system 700 comprises communication interface 701, user interface 702, and processing system 703. Processing system 703 is linked to wireless communication interface 701 and user interface 702. Processing system 703 includes processing circuitry 705 and memory device 706 that stores operating software 707. Adaptive buffer management system 700 may include other well-known components such as a battery and enclosure that are not shown for clarity. Adaptive buffer management system 700 may be a telephone, computer, e-book, mobile Internet appliance, media player, game console, wireless network interface card, or some other communication apparatus—including combinations thereof.

Communication interface 701 comprises components that communicate over communication links, such as network cards, ports, RF transceivers, processing circuitry and software, or some other communication devices. Communication interface 401 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes conditions determination module 708 and segment discard module 709. Operating software 707 may further include an operating system, utilities, drivers, network interfaces, applications, or some other type of software. When executed by processing circuitry 705, operating software 707 directs processing system 703 to operate adaptive buffer management system 700 as described herein.

In particular, operating software 707 directs processing system 703 to receive a plurality of packets representing a media stream into the adaptive media buffer, wherein the media stream comprises a sequence of media segments structured into a plurality of segment layers. Condition determination module 708 directs processing system 703 detect loss of one or more packets of the plurality of packets, wherein the one or more packets represent a media segment of the plurality of media segments. Condition determination module 708 directs processing system 703 to estimate a round trip delay for packets between the adaptive media buffer and a sender of the media stream and determine a current depth of the media segments within the adaptive media buffer. In response to detecting the loss of the one or more packets, segment discard module 709 directs processing system 703 discard one or more media segments of the media segments within the adaptive media buffer based on the round trip delay, the current depth, and a layer of the plurality of segment layers into which each of the one or more media segments is included The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing an adaptive media buffer, comprising:

receiving a plurality of packets representing a media stream into the adaptive media buffer of a receiver system configured to present the media stream, wherein the media stream comprises a sequence of media segments structured into a plurality of segment layers, wherein the plurality of segment layers comprise a hierarchy for the sequence of media segments such that higher media segments in the hierarchy include data representative of differences from respective lower media segments in the hierarchy;

detecting loss of one or more packets of the plurality of packets, wherein the one or more packets represent a media segment of the plurality of media segments;

estimating a round trip delay for packets between the adaptive media buffer and a sender of the media stream;

determining a current depth of the media segments within the adaptive media buffer, wherein the current depth comprises an indication of a number of media segments within the adaptive media buffer that can be passed to a decoder of the receiver system before the media segment represented by the one or more packets is reached; and in response to detecting the loss of the one or more packets, discarding one or more media segments of the media segments within the adaptive media buffer based on the round trip delay, the current depth, and a layer of the plurality of segment layers into which each of the one or more media segments is included.

2. The method of claim 1, further comprising:

in response to detecting the loss of the one or more packets, determining whether to request retransmission of the one or more packets based on the round trip delay and the current depth.

3. The method of claim 2, further comprising:

upon determining to request retransmission, requesting the one or more packets from the sender and holding frames starting with the media segment until the one or more packets are received from the sender; and upon determining not to request retransmission, discarding the media segment and other media segments that refer to the media segment from the adaptive media buffer.

4. The method of claim 3, further comprising:

upon receiving the one or more packets from the sender, passing the media segment to the decoder and passing remaining media segments to the decoder at a rate that speeds up presentation of the media stream until buffer delay returns to a threshold delay value.

5. The method of claim 1, wherein the plurality of segment layers include a base layer, which is lowest in the hierarchy, and a plurality of enhanced layers, which are at successive higher layers in the hierarchy, that each refer either to a media segment of the base layer or to a media segment of a lower enhanced layer of the plurality of enhanced layers.

6. The method of claim 5, wherein a media segment included in a higher level enhanced layer is more likely to be discarded than a media segment in either a lower level enhanced layer or a base layer.

7. The method of claim 1, wherein discarding the one or more media segments is further based on content priority indicators associated with the media segments.

8. The method of claim 1, wherein estimating the round trip delay comprises:

measuring a depth of the media segments within the buffer during one or more packet retransmission events; and determining the round trip delay based on the depths of the media segments within the buffer during the one or more packet retransmission events.

9. A non-transitory computer readable medium having instructions stored thereon that, when executed by a processor system of a receiver system configured to present a media stream, direct the processor system to perform a method of managing an adaptive media buffer, the method comprising:

receiving a plurality of packets representing the media stream into the adaptive media buffer of the receiver system, wherein the media stream comprises a sequence of media segments structured into a plurality of segment layers, wherein the plurality of segment layers comprise a hierarchy for the sequence of media segments such that higher media segments in the hierarchy include data representative of differences from respective lower media segments in the hierarchy;

detecting loss of one or more packets of the plurality of packets, wherein the one or more packets represent a media segment of the plurality of media segments;

estimating a round trip delay for packets between the adaptive media buffer and a sender of the media stream;

determining a current depth of the media segments within the adaptive media buffer, wherein the current depth comprises an indication of a number of media segments within the adaptive media buffer that can be passed to a decoder of the receiver system before the media segment represented by the one or more packets is reached; and in response to detecting the loss of the one or more packets, discarding one or more media segments of the media segments within the adaptive media buffer based on the round trip delay, the current depth, and a layer of the plurality of segment layers into which each of the one or more media segments is included.

10. The non-transitory computer readable medium of claim 9, wherein the method further comprises:

in response to detecting the loss of the one or more packets, determining whether to request retransmission of the one or more packets based on the round trip delay and the current depth.

11. The non-transitory computer readable medium of claim 10, wherein the method further comprises:

upon determining to request retransmission, requesting the one or more packets from the sender and holding frames starting with the media segment until the one or more packets are received from the sender; and upon determining not to request retransmission, discarding the media segment and other media segments that refer to the media segment from the adaptive media buffer.

12. The non-transitory computer readable medium of claim 11, wherein the method further comprises:

upon receiving the one or more packets from the sender, passing the media segment to the decoder and passing remaining media segments to the decoder at a rate that speeds up presentation of the media stream until buffer delay returns to a threshold delay value.

13. The non-transitory computer readable medium of claim 9, wherein the plurality of segment layers include a base layer, which is lowest in the hierarchy, and a plurality of enhanced layers, which are at successive higher layers in the hierarchy, that each refer either to a media segment of the base layer or to a media segment of a lower enhanced layer of the plurality of enhanced layers.

14. The non-transitory computer readable medium of claim 13, wherein a media segment included in a higher level enhanced layer is more likely to be discarded than a media segment in either a lower level enhanced layer or a base layer.

15. The non-transitory computer readable medium of claim 9, wherein discarding the one or more media segments is further based on content priority indicators associated with the media segments.

16. The non-transitory computer readable medium of claim 9, wherein estimating the round trip delay comprises:

measuring a depth of the media segments within the buffer during one or more packet retransmission events; and determining the round trip delay based on the depths of the media segments within the buffer during the one or more packet retransmission events.

17. An adaptive media buffer management system, comprising:

a communication interface configured to receive a plurality of packets representing a media stream into an adaptive media buffer of a receiver system configured to present the media stream, wherein the media stream comprises a sequence of media segments structured into a plurality of segment layers, wherein the plurality of segment layers comprise a hierarchy for the sequence of media segments such that higher media segments in the hierarchy include data representative of differences from respective lower media segments in the hierarchy;

a processing system configured to detect loss of one or more packets of the plurality of packets, wherein the one or more packets represent a media segment of the plurality of media segments, estimate a round trip delay for packets between the adaptive media buffer and a sender of the media stream, determine a current depth of the media segments within the adaptive media buffer, wherein the current depth comprises an indication of a number of media segments within the adaptive media buffer that can be passed to a decoder of the receiver system before the media segment represented by the one or more packets is reached, and, in response to detecting the loss of the one or more packets, discarding one or more media segments of the media segments within the adaptive media buffer based on the round trip delay, the current depth, and a layer of the plurality of segment layers into which each of the one or more media segments is included; and a memory system configured to store the adaptive media buffer.

18. The adaptive media buffer management system of claim 17, further comprising:

the processing system configured to, in response to detecting the loss of the one or more packets, determine whether to request retransmission of the one or more packets based on the round trip delay and the current depth.

19. The adaptive media buffer management system of claim 18, further comprising:

the processing system configured to, upon determining to request retransmission, request the one or more packets from the sender and holding frames starting with the media segment until the one or more packets are received from the sender, and, upon determining not to request retransmission, discarding the media segment and other media segments that refer to the media segment from the adaptive media buffer.

20. The adaptive media buffer management system of claim 17, wherein the plurality of segment layers include a base layer, which is lowest in the hierarchy, and a plurality of enhanced layers, which are at successive higher layers in the hierarchy, that each refer either to a media segment of the base layer or to a media segment of a lower enhanced layer of the plurality of enhanced layers.

* * * * *